May 25, 1948.     B. W. WEISEL     2,442,318
INDEXING BACK-OFF FOR GRINDERS
Filed Sept. 22, 1944     2 Sheets-Sheet 2
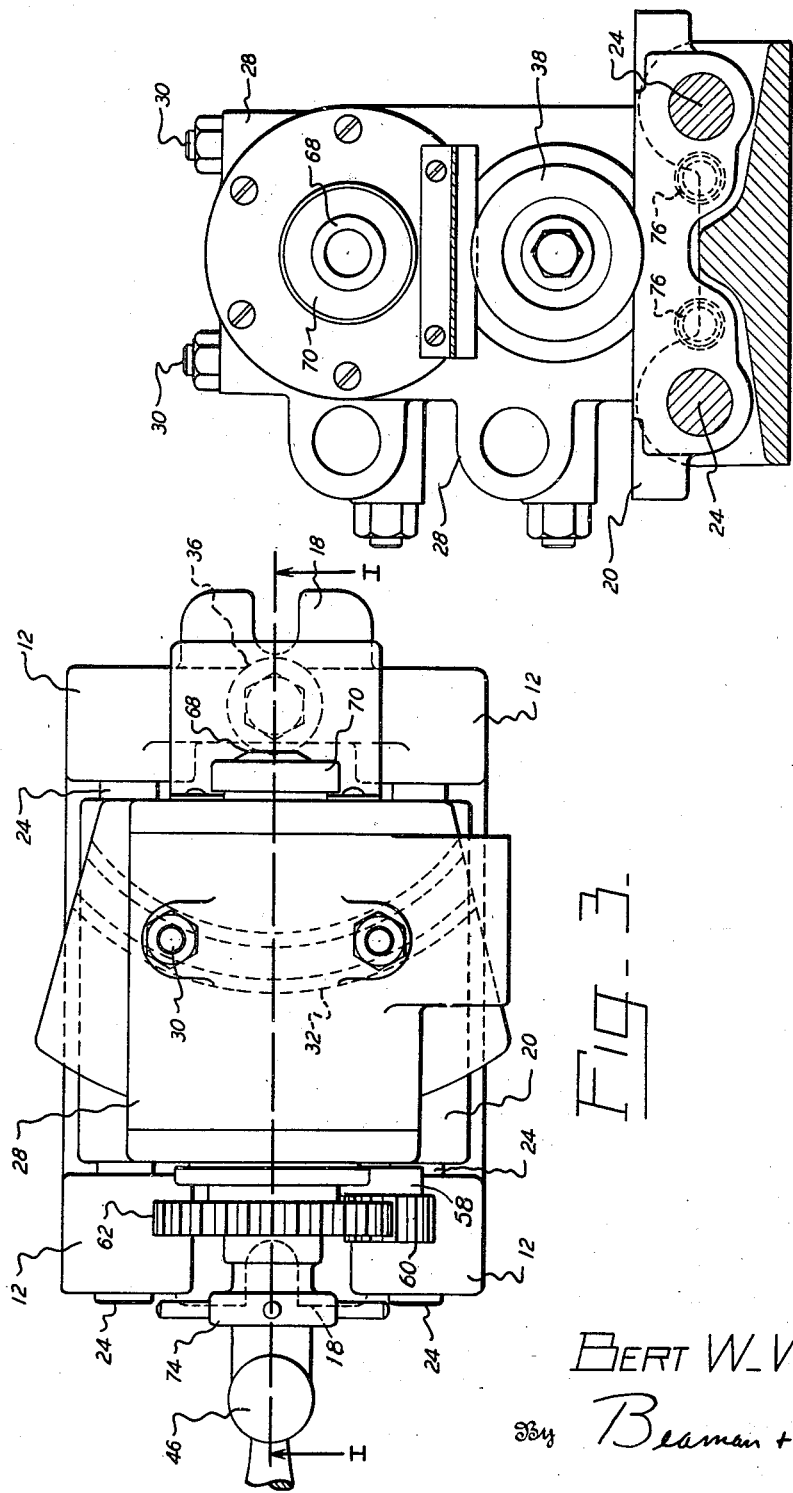
Inventor
BERT W. WEISEL
By Beaman + Lany Ford
Attorneys Patented May 25, 1948

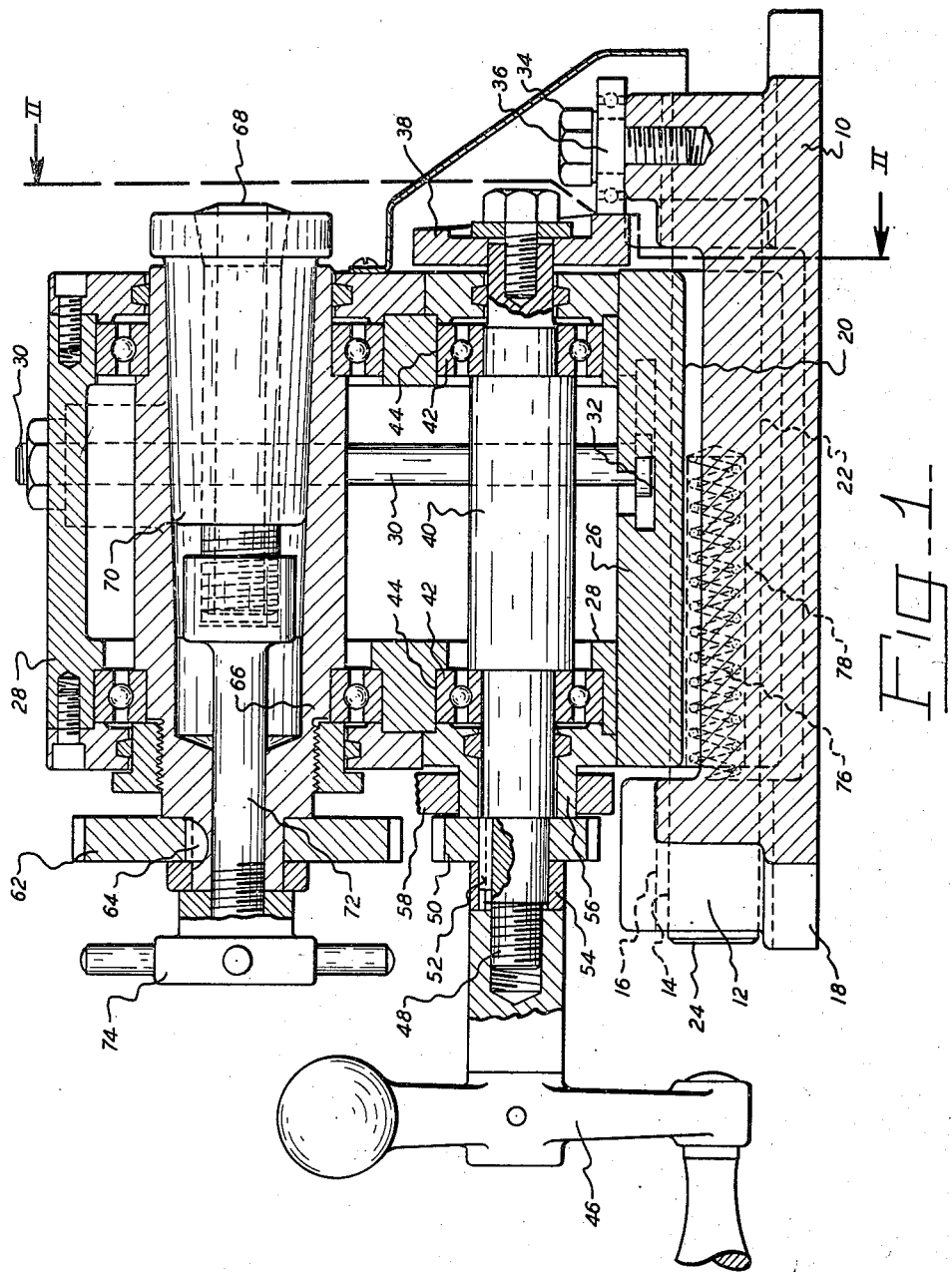

2,442,318

UNITED STATES PATENT OFFICE 2,442,318

INDEXING BACK-OFF FOR GRINDERS

Bert W. Weisel, Jackson, Mich.

Application September 22, 1944, Serial No. 555,215

3 Claims. (Cl. 51—219)

The present invention relates to an apparatus which is designed to go on a table of a tool grinder for symmetrically grinding and backing-off the lead angle of multifluted tools. For example, the apparatus is designed to be used in connection with the grinding of the lead angle on such multifluted tools as taps, drills, reamers, center drills, counterborers, end mills and the like. The grinding wheel is dressed to the desired form and angle and the tool held in the apparatus according to the present invention is fed relative to the grinding wheel. The principles of the invention may also be used for other machining operations where indexing and operations similar to backing-off are desired.

Thus one of the objects of the present invention resides in an improved apparatus of the class described for the symmetrical grinding and backing-off of the lead angle of multifluted tools.

Another object of the present invention is to provide an improved apparatus of the class described with change gears to enable the grinding and backing-off of tools of a varying number of flutes.

A further object of the invention is to provide an improved indexing back-off attachment for tool grinders.

A still further object of the invention is to provide an indexing back-off attachment for tool grinders which may be readily accommodated to grind tools having a varying number of flutes over a relatively wide range.

A still further object of the invention resides in providing an apparatus of the type described in which a simple, inexpensive arrangement permits easy manual backing-off and indexing of the tool during the grinding operation.

Another object of the invention is to provide apparatus of the type described having a carriage bearing a manually rotated shaft which carries cam mechanism for backing-off operation and a chain of gears for the indexing operation for driving a collet in which the tools are held during the grinding operation.

These and other objects and advantages of the present invention residing in the combination, arrangement and construction of parts will be more fully desecribed in the following specification.

In the drawing, wherein one embodiment of the invention is illustrated,

Fig. 1 is a vertical cross-sectional view taken on line I—I of Fig. 3,

Fig. 2 is a view of the apparatus shown in Fig. 1 taken on the line II—II of Fig. 1, and Fig. 3 is a top view of the construction shown in Fig. 1.

Referring to the drawing, the base 10 is in the form of a casting. At opposite ends and located on opposite sides of the casting 10 are bosses 12 having aligned bores 14 carrying bushings 16. Slotted ears 18 at opposite ends of the base 10 are adapted to receive hold-down bolts for firmly securing the base 10 in a well known manner to the table of the grinder.

The carriage 20 is in the form of a casting having a pair of spaced axially extending bores 22 in which the guide pin 24 is carried and held against relative movement to cause the end of the pin 24 to slide within the bushing 16. Supported from the upper surface 26, of the carriage 20, is a housing 28. The housing 28 is adjustably secured to the carriage 20 through bolts 30 having the heads thereof located in the arcuate T-slot 32 having a center coinciding with the axis of the stud 34 which supports the inner and outer racers of the ball bearing 36, the head 34 being threaded into the casting 10.

A back-off cam 38 is removably keyed to the outer end of the manually rotatable drive shaft 40. Suitable antifriction bearings 42, supported in aligned bores 44, support the shaft 40 for rotation through manipulation of the hand crank 46. The crank 46 is removably secured to the reduced end 48 of the shaft 40 to permit changing the pick-off gear 50, which is keyed to the shaft 40 at 52. A spacer is indicated at 54 for holding the gear 50 against the thrust collar 56. Mounted on the collar 56 is a bracket 58 carrying the idler gear 60 which meshes with the change gear 62. As illustrated, the gear 62 is keyed at 64 to the collet spindle 66. The collet 68 operates within the sleeve 70, being loosened and tightened in the usual manner by the draw bar 72 through the nut 74. The tool to be ground with clearance is held in the collet 70 and rotated with the spindle 66.

The operation of the heretofore described construction is as follows: With the base 10 firmly secured in position relative to the grinding wheel, the proper angularity of the carriage 20 relative to the grinding wheel may be obtained by loosening the bolt 30 and swinging the carriage around the axis of the stud 34. When the correct angularity has been obtained, tightening of the bolt 30 will rigidly position the carriage 20 relative to the base 10. Assuming that it is desired to back-off the lead angle of a six fluted reamer, the reamer will be supported in the collets 68 and the first flute indicated in any well-known manner. In the example given, the change gears 50 and 62 would be selected to rotate the spindle 66 sixty degrees for each revolution of the shaft 40 on which the cam 38 is carried.

Spring 76 in the pockets 78 urge the carriage 20 to the right, as viewed in Fig. 1, to bring the cam 38 at all times into engagement with the outer race of the bearings 36 rotating about the axis of the stud 34. Rotation of the shaft 40 through the crank 46 will cause similar rotation of the cam 38 producing a back-and-forth movement of the carriage 20 each revolution of the shaft 40. With the proper change gears 50 and 62 selected for backing-off the lead angle on a six fluted reamer, each revolution of the shaft 40 will produce a backing-off motion while the reamer in the collets 68 is being rotated through 60 degrees.

It should be readily apparent that a very simple device has been provided which through manual rotation of the shaft 40 is capable of symmetrically backing-off the lead angle of multifluted tools. Through the selection of the proper pick-off gears 50 and 62, the device is capable of being used in backing off of tools over a wide range of cutting flutes or edges. It will be observed that the angularity of the carriage 20 relative to the base 10 may be changed without altering the relationship between the cam 38 and the outer race of the roller bearings 36 in view of the fact that the pivotal axis of the carriage 20 is coaxial with that of the outer race 36.

As will be apparent to those skilled in the art, the principles of construction and operation of the described device may be used in machining operations other than in connection with the backing-off of multifluted tools.

Having thus described my invention, what I desire to secure by Letters Patent and claim is:

1. A compact self-contained fixture adapted to be supported on the table of a tool grinder for the symmetrical grinding and backing-off of the lead angle of multifluted tools, comprising a base to be fixed to the table of the tool grinder, a reciprocable carriage mounted on said base, a housing on said carriage, a drive shaft horizontally disposed to said base and supported in said housing, a driven shaft located above said drive shaft and likewise supported in said housing, tool holding means on said driven shaft, changeable gearing between said shafts for effecting partial rotation of said driven shaft during each rotation of said drive shaft, a manual crank at the rear end of said drive shaft, a cam located at the forward end of said drive shaft, a cam follower mounted on said base adjacent the forward end of said drive shaft, spring means acting against said carriage for holding said cam against said follower to reciprocate said carriage each rotation of said drive shaft, said housing being adjustable on said carriage in an arc having its center at a point adjacent the forward end of said drive shaft.

2. A fixture as set forth in claim 1 wherein said housing is supported for adjustment along an arc having a center common to that of said cam follower.

3. A compact self-contained fixture adapted to be supported on the table of a tool grinder for the symmetrical grinding and backing-off of the lead angle of a multifluted tool comprising a base to be fixed to the table of the tool grinder, a reciprocable carriage mounted above said base, a housing upon said carriage, said housing being adjustable on said carriage along an arc, a drive shaft horizontally disposed to said housing, a driven shaft parallel to and located above said drive shaft, gearing between said shafts, a tool holder on said driven shaft, means for rotating said drive shaft at one end thereof, a cam upon the opposite end of said drive shaft, and a cam follower affixed to said base and located in the center of the arc about which said housing is adjustable.

BERT W. WEISEL.

REFERENCES CITED

The following references are of record in the file of this patent:

UNITED STATES PATENTS

| Number | Name | Date |
|---|---|---|
| 641,107 | Heister | Jan. 9, 1900 |
| 819,173 | Schmaltz | May 1, 1906 |
| 821,849 | Benicke | May 29, 1906 |
| 2,217,091 | Zwick | Oct. 8, 1940 |
| 2,258,727 | Bannister | Oct. 14, 1941 |

FOREIGN PATENTS

| Number | Country | Date |
|---|---|---|
| 23,609 | Great Britain | Nov. 4, 1908 |